Nov. 10, 1959     R. D. COOKSLEY     2,912,006
VALVE STRUCTURE

Filed March 12, 1956     3 Sheets-Sheet 1

INVENTOR.
RALPH D. COOKSLEY
BY
Woodhams Blanchard & Flynn
ATTORNEYS

Nov. 10, 1959     R. D. COOKSLEY     2,912,006
VALVE STRUCTURE

Filed March 12, 1956     3 Sheets-Sheet 2

INVENTOR.
RALPH D. COOKSLEY
BY
Woodhams Blanchard + Flynn
ATTORNEYS

Nov. 10, 1959  R. D. COOKSLEY  2,912,006
VALVE STRUCTURE

Filed March 12, 1956  3 Sheets-Sheet 3

INVENTOR.
RALPH D. COOKSLEY
BY
Woodhams Blanchard and Flynn
ATTORNEYS

United States Patent Office 2,912,006
Patented Nov. 10, 1959

2,912,006
VALVE STRUCTURE

Ralph D. Cooksley, Kalamazoo, Mich., assignor to General Gas Light Company, Kalamazoo, Mich., a corporation Application March 12, 1956, Serial No. 570,903

7 Claims. (Cl. 137—620)

This invention relates in general to valve structure and particularly to a type of such structure wherein the valve may be operated without the use of springs, and may be either normally open or normally closed depending only upon the manner of connecting supply and exhaust conduits thereto.

While a multitude of valves have already been designed for an almost infinite number of purposes in all phases of industrial activity, there has remained an important demand which, insofar as I am aware, has not been filled although it has existed for a long period of time. This demand is for an inexpensive, multi-purpose valve which is capable of being made relatively small, as well as relatively large, which can be operated in a variety of ways and is adaptable to a very large number of uses.

More specifically, valves for controlling the flow of pressure fluid to a load operated thereby, as a power cylinder, are normally of relatively small size. For example, the ports may be one quarter inch in diameter where the use is with compressed air. However, it is desirable to provide a valve design which, though basically designed for one quarter inch ports, can be easily modified to have one eighth inch ports as well as to have ports substantially larger. Likewise, in order to provide for versatility in use, it is desirable that the same valve be capable of either normally open or normally closed operation and be easily convertible from one to the other by simple means, as contrasted with many present valves wherein two completely different valves are required for these two types of service. It is also desirable that such a valve be operable without springs, be readily capable of simple and inexpensive fabrication and be capable of giving reliable service over a long period of time with a minimum of maintenance effort.

It is further desirable that such a valve be provided which will be sufficiently easy to move from either opened or closed position to the other of such positions that the valve is adaptable for control by relatively small solenoids, or other selectively energizable means involving relatively little mechanical force, as well as capable of being operated with only minor modification by hand, by foot or by any of the limitless number of mechanical devices capable of applying a reciprocable motion through a small amplitude to the movable portion of the valve.

It is still further desirable to provide a valve capable of controlling pressure fluid, including air, which will be absolutely fluid tight even though it has been made under conditions of relatively loose tolerances, made by unskilled help and has been subjected to long and rigorous use. In this way it is possible, for example, for compressed air to be left on air utilizing equipment for a matter of hours or even days without air pressure being lost from the system even though the air utilizing means, as a pressure cylinder, is itself of relatively loose fit and will leak air when same is applied thereto.

Also, in order to provide a single basic unit which can be utilized in and for a large number of uses, it is desirable that a valve be provided which consists of a single simple basic unit which is capable of being converted into either normally opened or normally closed operation merely by changing the connections applied to the valve and without requiring changes of any internal parts of the valve. It is further desirable that the valve be operable by a single uni-directionally applied force of relatively short stroke and a force which is in the same direction regardless of whether the valve is operating as a normally opened or normally closed valve, said force being in either case effective to move it into other than its normal condition. In this way, there is provided a valve of extremely low cost but of extremely great accuracy and versatility in both use and methods of control.

Accordingly, a major object of the invention has been to provide a valve for handling a pressure fluid, which valve is capable of a multiplicity of uses, operable in a multiplicity of ways and capable of very inexpensive fabrication.

A further object of the invention has been to provide a valve, as aforesaid, which can be either normally open or normally closed and which is capable of rapid and easy conversion from one manner of operation to the other.

A further object of the invention has been to provide a valve, as aforesaid, which can be either normally opened or normally closed as determined by the connections thereto and which can be operable by a single, and the same, uni-directional force in either normally opened or normally closed condition.

A further object of the invention has been to provide a valve, as aforesaid, which can be either normally opened or normally closed and wherein the operating element thereof moves in a single, and the same, direction to move the valve out of its normal position with respect to either the normally opened or normally closed condition thereof.

A further object of the invention has been to provide a valve, as aforesaid, which will be reliable in operation and which has a minimum of wearing surfaces thereby insuring trouble free use for a long period of time.

A further object of the invention has been to provide a valve, as aforesaid, which will have little or no tendency to stick in any one position and can therefore be readily and reliably operated by the application of relatively small force thereto.

A further object of the invention has been to provide a valve, as aforesaid, which will be extremely tight when in closed condition, as evidenced by its failure to leak compressed air when placed under water.

A further object of the invention has been to provide a valve, as aforesaid, which will be extremely tight when in closed condition wherein the closing portion thereof is closely adjacent the point of entry of pressure fluid into said valve, whereby pressure can be left on the valve over a long period of time and pressure fluid will not leak from the system even where the valve is connected to cylinders having relatively loose fit and no other shut off valve is provided.

A further object of the invention has been to provide a device, as aforesaid, which can be made with extremely liberal tolerances and, even when used with air, will still provide an absolutely tight valve.

A further object of the invention has been to provide a valve, as aforesaid, which will be capable of continuous use at an extremely rapid rate of operation over a long period of time with a minimum of wear.

A further object of the invention has been to provide a device, as aforesaid, which can be subjected to long and rigorous use, and thereby substantial wear and which will still be capable of being absolutely air tight when in closed condition.

A further object of the invention has been to provide a device, as aforesaid, which can be rapidly and easily assembled by simple hand steps, steps which can be readily performed by unskilled labor, and which will require little or no running in, conditioning or adjusting prior to becoming capable of successful and absolutely air tight operation.

A further object of the invention has been to provide a device, as aforesaid, which can be expressed by a simple basic type of valve unit and which unit can then be rendered, merely by changing the connections thereto or the particular mode of operating the single mechanical operating element, effective for a multiplicity of uses in either normally opened or normally closed condition and which will be operable in any of a variety of ways which may include manual, pedal, electrical, or by other pressure fluid systems, or in any other manner in which a single uni-directional short stroke force can be applied A further object of the invention has been to provide a valve, as aforesaid, whose operation is not dependent upon the use of springs or other resilient means.

A further object of the invention has been to provide a valve, as aforesaid, whose design can be readily modified to accommodate different sizes of ports and wherein the port sizes in one valve of a given size may be varied within relatively wide limits, as compared to other presently known valves, without changing the other parts of the valve structure.

A further object of the invention has been to provide a basic valve structure, as aforesaid, which can be readily accommodated to effect control in a multiplicity of ways and is, therefore, well adapted to automation use.

A further object of the invention has been to provide a valve, as aforesaid, which can be utilized with a wide range of fluid pressures without change in the design of the valve.

Other objects and purposes of the invention will be apparent to persons acquainted with equipment of this general type upon reading of the following disclosure and inspecting the accompanying drawings.

General description

Figure 1:
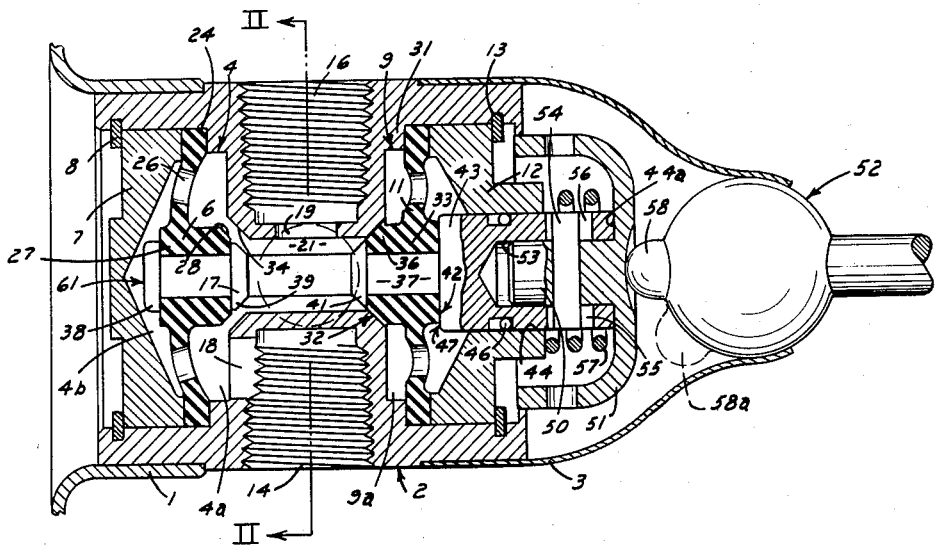
Figure 1 is a sectional view through the central axis of the valve.

In order to meet the objects and purposes set forth above, as well as others related thereto, I have provided a valve structure (Figure 1) comprised of a valve housing 2 having a central passageway 21 extending between a pair of chambers 4 and 9. An axially reciprocable valve rod 37 extends through said passageway and said chambers and supports means for sealing one chamber or the other from said passageway. A plurality of ports are connected with one of said chambers or said passageway and one end of said rod extends from said housing for manual or mechanical operation thereof. Resilient diaphragms 6 and 11 encircle, and are secured to, said rod within said chambers 4 and 9, respectively. Said diaphragms, which are perforated, are secured to the radial walls of their respective chambers.

Detailed construction

As shown in Figure 1, the base 1 may be of any convenient type for fastening the valve housing 2 firmly to its place of use. The housing 2, which in this embodiment is of generally cylindrical shape, is mounted firmly within the base 1 and may if desired carry a cap 3 for purposes appearing hereinafter. Provided within the housing 2, near the left end thereof as shown in Figure 1, is the first chamber 4 which is divided into two parts 4a and 4b by the diaphragm 6 and which is closed at its left end by a piece 7, said piece being held in place in any convenient manner, such as by the snap ring 8. At the right end of the housing 2 there is located the second chamber 9 which is divided into two parts by the diaphragm 11 and which is closed by an end piece 12. Said end piece is held in position by any convenient means, such as a snap ring 13. Said chambers are advantageously cylindrical and co-axial with said housing and are interconnected by a central passageway 21 of substantially less diameter than said chambers and preferably co-axial therewith. The diaphragms 6 and 11 are made of any flexible material such as either natural or synthetic rubber, which is capable of flexing a very large number of times without breaking and which will be resistant to the materials to be handled by the valve.

Figure 2:
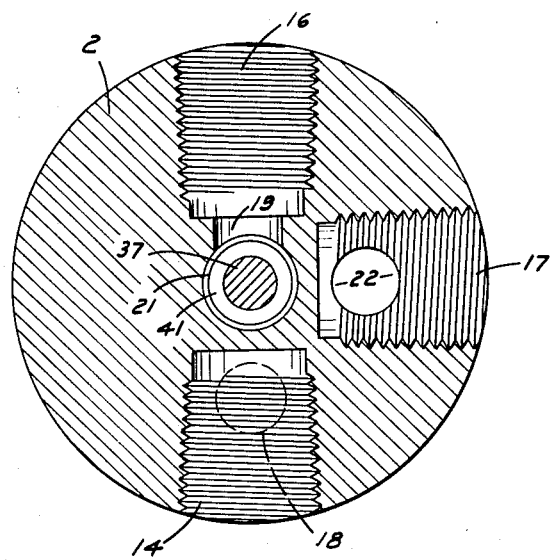
Figure 2 is a sectional view taken along the line II—II of Figure 1.

The housing 2 has a plurality of ports (Figures 1 and 2) which, since their functions change according to the type of use being made of the valve, are best for descriptive purposes identified as a first port 14, a second port 16 and a third port 17. Said ports are provided with any convenient type of conduit engaging means, such as pipe threads, and their axes are preferably radial of said housing. The first port 14 has a passageway 18 extending from its inner end radially of said port into the right part 4a of the chamber 4. The second port 16 has a passageway 19 extending axially of said port into the central passageway 21 extending between, and connecting, the chambers 4 and 9. The third port 17 has a passageway 22 extending radially of said port into the left part 9a of the chamber 9.

The diaphragm 6 which may be secured to the housing 2 in any convenient manner, here has its outer edge held by the end piece 7 against the shoulder 24 within the housing 2. Said diaphragm has a series of openings 26 therethrough and is provided with a relatively heavy central hub 27 embracing said rod 37 and having a conical valve face 28 at the axial inner end thereof.

The diaphragm 11 is similarly mounted by the end piece 12 against a shoulder 31, and has a conical valve face 32 at the inner axial end of its hub 33 which snugly embraces the rod 37. A conical valve seat 34 is provided around the leftward end of the central passageway 21 to cooperate with the valve face 28 and a conical valve seat 36 is provided around the rightward end of the passageway 21 to cooperate with the valve face 32. The opposing surfaces of the hubs 27 and 33, including the conical faces 28 and 32 thereof, may be referred to hereinafter simply as the valves 28 and 32 for convenience in description.

The valve rod or stem 37, which is positioned co-axially within the central passageway 21 of the valve housing 2, is supported at its left end by the hub 27 of the diaphragm 6 and is supported at its right end by both the hub 33 of the diaphragm 11 and by the end piece 12. The diaphragms may be held fixed with respect to the rod 37 in any of many conventional ways. In this embodiment the diaphragm hub 27 is snugly held between the integral annular flanges 38 and 39 provided on the rod 37 near its left end 61, and the diaphragm is snugly held between the annular flange 41 and the opposing surface 42 of the head 43, which head is secured to the rightward end of the rod 37.

The head 43, which is radially larger than the actuating rod 37, is slidingly received within a central opening 44 in the end piece 12. Suitable packing means, as an O-ring 46, is provided for sealing the head 43 with respect to the end piece 12 against the passage of pressure fluid therebetween. The leftward face 42 of the head 43 is of greater diameter than the outer periphery of the conical face 32 and the adjacent portion of the hub 33 within the chamber 9a to provide a pressure surface 47 for purposes appearing hereinafter.

Any convenient means may be provided for applying an external force, leftwardly as appearing in Figure 1, onto the actuating rod 37, only a leftwardly force being required inasmuch as the pressure fluid within the valve, as hereinafter set forth in detail, itself provides a rightwardly acting force.

In this embodiment, such leftwardly acting force may be applied mechanically by the button 51 which may itself be actuated in any convenient manner, manually by lever mechanism 52, hydraulically, or electrically. The button 51 has a central boss 50 received slidingly into a central recess 53 in the right end of the head 43, said boss 50 being guided by a pin 54 extending diametrically through the boss and received in axially elongated slots 55 and 56 extending through the wall of the recess 53 in the head 43. A spring 57 provides a constant urging of the button 51 away from the end piece 12 against which the spring bears. The presence of this spring functions to provide a cushioning effect between the button and the head 43 where it is operated manually and, where a mechanical member such as the lever 52 is used, it provides against existence of lost motion between said button and the operating tip 58 of said lever.

*Operation*

The operation of the valve will be readily understood by those skilled in the art but will be detailed hereinafter for the purpose of effecting a complete disclosure.

Considering the first port 14 as the inlet, the second port 16 as the outlet to the working load and the third port 17 as the exhaust to a point of low pressure, such as the atmosphere when the working fluid is compressed air, it will be recognized that with the valve parts in the position shown in Figure 1, air will pass through the port 14 and the passageway 18 into the part 4a of the chamber 4 and thence past the valve 28 into the passageway 21 and thence through the passageway 19 through the port 16 toward the load. It will be apparent that air pressure within the passageway 21 will press equally in both axial directions with respect to the valve rod 37 against the opposing surfaces of the flanges 39 and 41 and against the immediately adjacent, opposing portions of the diaphragm hubs 27 and 33. These pressures will balance each other and will present no tendency for the valve rod 37 to move in either axial direction. Simultaneously with the movement of air into the passageway 21, said air will pass through the openings 26 into the chamber 4b and will press against the entire surface on the left side of the diaphragm 6, including the left end of the flange 38 and rod 37. However, the pressure applied to the leftward end 61 of the rod 37 is not balanced by any other pressure and hence the pressure so applied, in conjunction with the reduction of pressure between the valve 28 and the valve seat 34 in response to Bernoulli's theorem as the air velocity is increased therethrough, will tend to urge the valve rod 37 rightwardly until the face 28 engages the seat 34. Thus, assuming that the control handle is in the position indicated by the broken lines 58a so that it is possible for the valve rod 37 to move rightwardly, the valve will close immediately upon the application of pressure at the first port 14. Any air that may be in the port 16 or parts connected thereto may now pass through the passageways 19 and 21, between the valve 32 and the seat 36 into the chamber 9a thence through the passageway 22 and exhaust through the port 17. Both sides of the chamber 9 being thus connected to the atmosphere, there will be no tendency on the part of the diaphragm 11 or parts associated therewith to affect the position of the valve rod 37.

With the movement of the handle 52 into the position shown in solid lines in Figure 1, the button 51 is depressed so that it bears against the extreme rightward end of the head 43 and thereby returns the valve to the position shown in Figure 1. This permits air to travel through the port 14, the passageway 18 between the valve 28 and the seat 34 and into the passageway 21 and thence out through the passageway 19 to the load. Closure of the valve 32 against the seat 36 will prevent air from passing therebetween to the exhaust port. Return of the control handle 52 to the position shown in broken lines 58a will again permit closure of the valve 28 against the seat 34 in the manner outlined above. Thus, the valve is normally closed but is so held by air pressure and no springs are required.

Now assuming that the pressure line is connected with the third port 17 and the first port 14 becomes the exhaust port. Air pressure now enters into the chamber 9 on both sides of the diaphragm 11 and is balanced on both sides of said diaphragm. However, it will quickly penetrate between the valve 32 and the seat 36 and will thus effect a rightward urging of the rod 37 in view of the greater area existing between the diameter of the hub 33 and the rod 37 by which a surface is provided effecting a rightward urging and the protection of the rightward surface of the hub 33 from contact by the pressure fluid by the rod 43. If any supplementary rightward urging is required, the rod 43 may be made oversize with respect to the diameter of the hub 33 to provide an additional surface 47 urging the system rightwardly. Any pressure fluid which escapes past the valve 28 will pass through the openings 26 to bear against the end 61 of the rod 37 and further assist in the rightward urging of said rod and the closing of the valve 28 against its seat 34. This effects an opening of the valve 32 and a closing of the valve 28, whereby air is permitted to travel from the port 17 to the central passageway 21 through the passageway 22 and thence out port 16 to the load. The valve 28, controlling communication to the port 14 which is now the exhaust port, is closed. Thus, the valve is normally open whenever the operating handle 52 is in the position indicated by the broken lines 52a.

Movement of the valve handle 52 into the position shown in solid lines effects a mechanical movement of the valve rod 37 leftwardly, closes the valve 32 against its seat 36 and opens the valve 28 to permit air from the load to pass through the port 16, the passageway 19, the central passageway 21, and through the passageway 18 to the port 14, which is now the exhaust, to atmosphere. Restoration of the operating handle 52 to the position shown in the broken lines 58a again permits the source of pressure at the port 17 to bear against the surface 47 and reopen the valve. Thus, this valve is normally open and is closed by mechanical, leftward movement of the rod head 43.

While from time to time throughout the foregoing discussion, compressed air has been referred to as the pressure fluid concerned, it will be recognized that this is for illustrative purposes only and that any other type of pressure fluid, whether compressible or non-compressible, will operate equally well.

Further, while mechanical movement of the head 43 by the handle 52 has been assumed for illustrative purposes, it will be recognized that said head 43 may be moved manually, pedally, or by any of many available types of mechanical means, either automatic, semi-automatic or manually operated.

It will be noted that a slight curve, or dishing, is provided in the diaphragms 6 and 11. This is provided solely to improve the ease of flexing of said diaphragms and may be eliminated without departing from the scope of the invention.

Similarly, while the button 51 is in this embodiment provided together with the spring 57 for the purpose of preventing the occurrence of lost motion between the head 43 and a mechanically contacting element, such as the tip 58 of the handle 52, it is apparent that this button and spring and associated parts are for convenience only, as for cooperating with a handle or a foot pedal. Either or both of said button 51 and said spring 57 may be eliminated in favor of direct manual engagement of the enlarged head 43 or engagement of said head by other mechanical devices.

Thus, it will be appreciated that the valve herein disclosed functions as either a normally opened valve or a normally closed valve solely by the manner of selection of the pressure and exhaust ports and it may be converted from either into the other merely by the interchanging of the functions of the first and third ports 14 and 17, respectively.

It will also be appreciated that the pressure induced functioning of the valve is effected by a substantial margin in case of either normally opened or normally closed operation so that the valve will operate rapidly at any ordinary operating pressure and, further, that the pressure may be reduced to a relatively low value, such as 25 p.s.i., without materially slowing the functioning of the valve.

Throughout the foregoing description it has been assumed that the housing of the valve is held stationary and that the valve rod is caused to move by any of a variety of suitable control devices. It will be readily apparent that the valve is equally well adapted to having its rod rigidly mounted to a suitable frame structure and effecting its operation by movement of the valve housing. This is particularly desirable in connection with appropriate feed back mechanism for servo-type controls.

Modified structures

Figure 3:
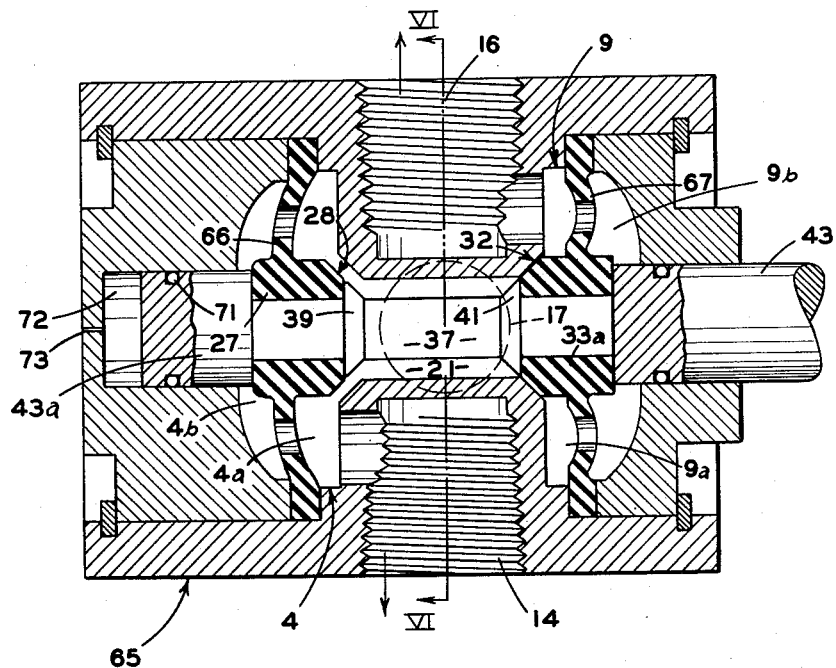
Figure 3 is a central, cross-sectional view of a modification of said valve.

As shown in Figure 3, the principal structure may be modified to produce an alternate structure 65 wherein rod 43 is duplicated as rod 43a on the opposite end of the rod 37, both of said rods 43 and 43a being larger than the diameter of the rod 37 but preferably less than the diameter of the hubs 33a and 27a. In this embodiment said rod 43a also is provided with suitable sealing members 71, such as O-rings, and is received in a chamber 72. A suitable passageway 73 is provided to vent the chamber 72 to the atmosphere. Port 17 is connected to a source of supply and the ports 14 and 16 are both connected to loads. The rod 37, including the valves 32 and 28, is axially movable in either axial direction. The diaphragms 66 and 67 are perforated disks which provide support for the rod 37, and their hubs constitute the valves 32 and 28, in the same manner as the corresponding diaphragms 6 and 11 in the form shown in Figure 1. Thus, when the rod 37 is urged in one axial direction, as in the leftward direction (Figure 3), until the valve 32 is closed, the valve 32 remains closed because the valve 28 exposes an effective surface to leftwardly acting pressure and the opposite side of the hub of diaphragm 66 is protected from the action of the pressure fluid by the presence of the rod 43a which is of a diameter larger than the diameter of the rod 37. Also, the fluid passing the valve 28 tends to impinge upon the diaphragm 66, thereby providing an appreciable amount of dynamic force tending to hold the valve 28 open. Fluid now passes from port 17 through passageway 21 past the valve 28 and out through port 14.

If the rod 37 is now shifted rightwardly until valve 28 is closed, the valve 32 will have an effective surface exposed to rightwardly acting pressure and the opposite side of said valve member, namely, the opposite side of the hub constituting said valve, is protected from the application of pressure thereagainst in a leftward direction by the presence of the rod 43. This will hold the valve 28 tightly shut as soon as it is closed, for the same reasons stated above with respect to the valve 32. Thus, fluid now flows from port 17 through passageway 21 past the valve 32 and out through port 16. Due to the low pressure zone created adjacent to either of said valves 28 and 32 as they approach the closed position, a positive, fast closing action will be effected.

Figure 4:
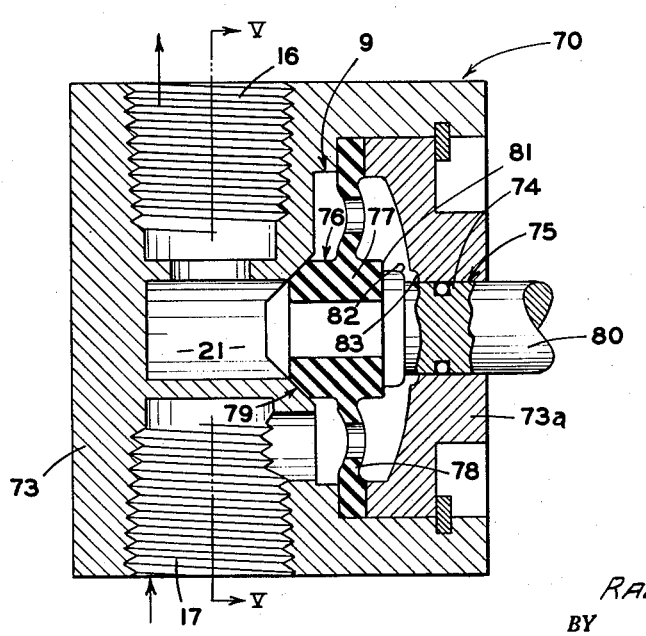
Figure 4 is a central, cross-sectional view of a further modification of said valve.
Figure 5:
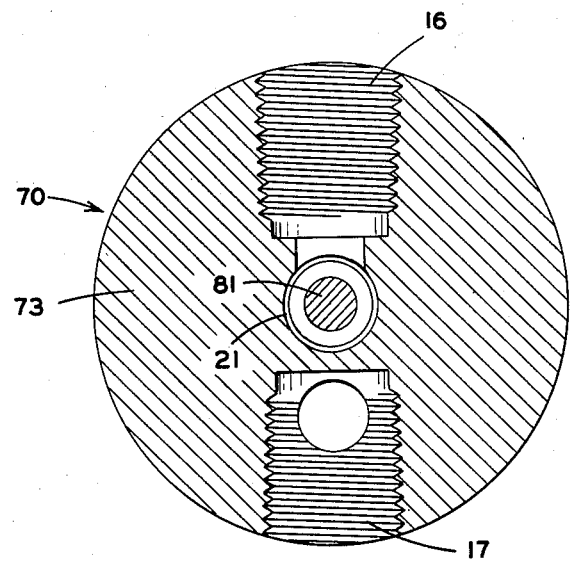
Figure 5 is a sectional view taken along the line V—V of Figure 4.
Figure 6:
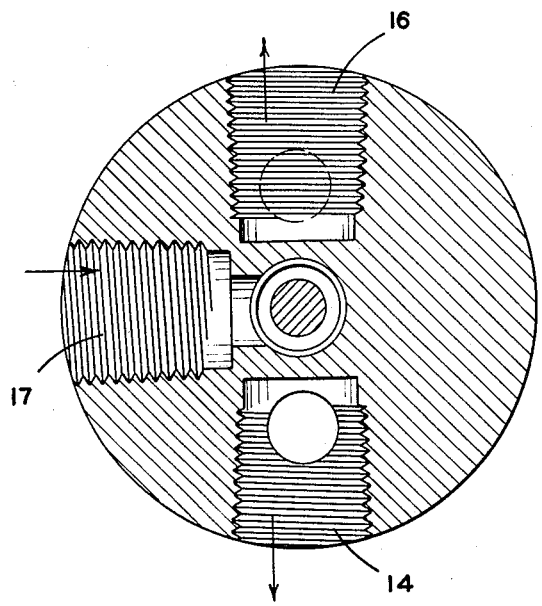
Figure 6 is a sectional view taken along the line VI—VI of Figure 3.

In the modified structure 70, shown in Figures 4 and 5, there is one inlet port 17, which communicates with the rightward chamber 9, and one outlet port 16, which communicates with the central passageway 21. There is no leftward chamber, as there is in the principal structure, and the hub 77 supporting the valve 76 is supported entirely by the diaphragm 78 and the rod 74 received within the opening 75.

The rod 74 is mechanically operable by any convenient means, as by an extension 80, which extends from the portion 73a of the housing 73. The rod 74, has a diameter larger than the diameter of the central opening 21 but in this embodiment smaller than the diameter of the hub 77. Thus, there is a greater effective area by which pressure fluid can urge the hub 77 rightwardly than that by which such pressure can urge the hub 77 leftwardly, and the degree of pressure differential can be readily adjusted from one specific valve design to another by varying the diameter of the rod 74 with respect to the diameter of the hub 77, without the necessity of varying the dimensions of any of the other parts. Accordingly, when the valve is closed there is a definite surface available at 81 to urge the valve leftwardly by which to hold the valve 76 firmly against the seat 79, but when said valve is open the entire area on the leftward side of the hub 77 is available to urge the valve rightwardly. Thus, regardless of whether the valve is in an open or in a closed position, the fluid pressure within the valve tends to hold it in such position. Thus, when the rod is leftwardly, as shown in Figure 4, and pressure is introduced through port 17, the valve 76 remains in closed position because of the larger effective pressure surface on its right side. When the rod is moved rightwardly, then the left side of the valve 76 has the larger effective pressure surface, and this holds the valve open. Because there is a relatively small difference in the effective pressure surfaces on opposite sides of the valve 76, operation of the rod 71 can be effected with a minimum of exertion and yet the closure or opening of the valve will be positive and secure in either case.

This effect can be accentuated if desired by providing a step 82 in the rod 74 and a corresponding recess 83 in the housing 73a. Thus, when the valve is closed as appearing in Figure 4, there is available not only the area 81 but also the area of the shoulder 82 for the action of pressure tending to hold the valve closed, but when the valve is open, the walls of the recess 83 will snugly receive the shoulder 82, shielding the radial surface of said shoulder from the action of pressure and thereby reducing the area available to pressure for urging the valve leftwardly.

Although particular, preferred embodiments of the invention have been disclosed hereinabove for purposes of illustration, it will be understood that variations or modifications thereof, which lie within the scope of the invention are fully contemplated unless specifically stated to the contrary in the appended claims.

I claim:

1. A valve construction, comprising: an elongated housing, said housing including means defining a pair of longitudinally spaced chambers, said chambers being closed at their remote ends; a passageway connecting the adjacent ends of said chambers, said passageway being of smaller cross-sectional area than said chambers and having oppositely facing valve seats formed at the ends thereof; said housing having three ports formed therein, one of said ports communicating with said passageway intermediate said valve seats and the other ports communicating respectively with the respective chambers; an inextensible valve rod extending through said passageway and beyond the axial ends thereof into said chambers, said valve rod being of smaller cross-sectional area than said passageway and defining therewith a zone through which fluid may flow between said chambers and said one port; a flexible diaphragm within and extending transversely across each of said chambers and mounted on said housing for flexing movement toward and away from the other chamber, said flexible diaphragms being connected to said valve rod and means on said valve rod and each said diaphragm defining a valve member sealingly engageable with the adjacent valve seat, the length of said valve rod between said valve members being substantially equal to the distance between said valve seats such that when one valve member sealingly engages its adjacent valve seat the other valve member is spaced from its adjacent valve seat and vice versa; said diaphragms having openings therethrough whereby fluid pressure within the respective chambers will act on both sides of the diaphragm therewithin.

2. A valve construction, comprising: an elongated housing, said housing including means defining a pair of longitudinally spaced, axially aligned chambers, said chambers being closed at their remote ends and being of the same size and shape; a passageway coaxial with said chambers and connecting the adjacent ends thereof, said passageway being of smaller cross-sectional area than said chambers and having oppositely facing valve seats formed at the ends thereof; a solid, inextensible valve rod extending through said passageway and beyond the axial ends thereof into said chambers, said valve rod being of smaller cross-sectional area than said passageway and defining therewith a zone through which fluid may flow; a flexible, resilient diaphragm within and extending transversely across each of said chambers and mounted on said housing for flexing movement toward and away from the other chamber, said diaphragms being connected to said valve rod for causing corresponding axial movement thereof in response to flexing of said diaphragms, means on each of said diaphragms defining a valve element sealingly engageable with the adjacent valve seat, the length of said valve rod being substantially equal to the distance between said valve seats so that when one element sealingly engages its adjacent valve seat, the other valve element is spaced from its adjacent valve seat; said diaphragms having openings therethrough whereby fluid pressure within the respective chambers will act on both sides of the diaphragm therewithin; said housing having three ports extending therethrough, one of said ports communicating with said passageway and the other two ports communicating respectively with the respective chambers at a location therein close to the adjacent valve seat and between the diaphragm and the adjacent end of said passageway; and axially movable actuating means extending through the remote end of one of said chambers and continuously engaging at least one of said valve rod and the diaphragm therewithin for moving said valve rod axially and thereby flexing said diaphragms.

3. A valve construction, comprising: an elongated housing, said housing including means defining a pair of longitudinally spaced chambers, said chambers being closed at their remote ends; a passageway connecting the adjacent ends of said chambers, said passageway being of smaller cross-sectional area than said chambers and having oppositely facing valve seats formed at the ends thereof; said housing having three ports formed therein, one of said ports communicating with said passageway and the other ports communicating respectively with the respective chambers; a solid inextensible valve rod extending through said passageway and beyond the axial ends thereof into said chambers, said valve rod being of smaller cross-sectional area than said passageway and defining therewith a zone through which fluid may flow between said chambers and said one port; a flexible diaphragm within and extending transversely across each of said chambers and mounted on said housing for flexing movement toward and away from the other chamber, said flexible diaphragms being connected to said valve rod and means on said valve rod and each said diaphragm defining a valve member sealingly engageable with the adjacent valve seat, the length of the valve rod between said valve members being substantially equal to the distance between said valve seats so that when one valve member engages its adjacent valve seat the other valve element is spaced from its adjacent valve seat and vice versa, said diaphragms having openings therethrough whereby fluid pressure within the respective chambers will act on both sides of the diaphragm therewithin; an axially movable actuating rod extending through the remote end of one of said chambers coaxial with said passageway and continuously engaging said valve rod for moving said valve rod axially; means in said one chamber, including the diaphragm therewithin and said actuating rod, defining pressure surfaces responsive to fluid pressure within said one chamber, said last named means providing a greater pressure surface area facing said passageway than the pressure surface area facing away from said passageway whereby when said one chamber is pressurized, the valve rod is urged toward the remote end of said one chamber; means in the other chamber, including the diaphragm therewithin, defining pressure surfaces responsive to fluid pressure within said other chamber, said last named means providing a greater pressure surface area facing away from said passageway than the pressure surface area facing toward said passageway whereby when said other chamber is pressurized, the valve rod is urged toward the valve seat adjacent said other chamber.

4. A valve construction according to claim 3 wherein said chambers and said diaphragms are of substantially identical size and shape so that the pressure surface areas facing the respective valve seats are substantially equal; said actuating means including a rod extending through the remote end of said one chamber and having a pressure surface facing the said valve seat of said one chamber so that the pressure surface area facing said valve seat is greater than the pressure surface area facing away from said valve seat; the other end of said valve rod being formed to provide a flat surface facing the remote end of said other chamber whereby the pressure surface area facing the remote end of said chamber is greater than the pressure surface area facing the valve seat thereof.

5. A valve construction, comprising: an elongated housing, said housing including means defining a pair of longitudinally spaced chambers, said chambers being closed at their remote ends; a passageway connecting the adjacent ends of said chambers, said passageway being of smaller cross sectional area than said chambers and having oppositely facing valve seats formed at the ends thereof, said housing having three ports formed therein, one of said ports communicating with said passageway and the other ports communicating respectively with the respective chambers; a solid, extensible valve rod extending through said passageway and beyond the axial ends thereof into said chambers, said valve rod being of smaller cross-sectional area than said passageway and defining therewith a zone through which fluid may flow between said chambers and said one port; a flexible diaphragm within and extending transversely across each of said chambers and mounted on said housing for flexing movement toward and away from the other chamber, said flexible diaphragms being connected to said valve rod and means on said valve rod and each said diaphragm defining a valve member sealingly engageable with the adjacent valve seat, the length of said valve rod between said valve members being substantially equal to the distance between said valve seats so that when one valve member engages the adjacent valve seat the other valve element is spaced from its adjacent valve seat and vice versa, said diaphragms having openings therethrough whereby fluid pressure within the respective chambers will act on both sides of the diaphragm therewithin; an axially movable actuating rod extending through the remote end of one of said chambers and continuously engaging said valve rod for moving said valve rod axially; means in said one chamber, including the diaphragm therewithin and said actuating rod, defining pressure surfaces responsive to fluid pressure within said one chamber, said last named means providing a greater pressure surface area facing toward said passageway than the pressure surface area facing away from said passageway whereby when said one chamber is pressurized, said valve rod is urged toward the remote end of said one chamber; means in the other chamber, including the diaphragm therewithin, defining pressure surfaces responsive to fluid pressure within said other chamber, said last named means providing a greater pressure surface area facing toward said passageway than pressure surface facing away from said passageway whereby when said other chamber is pressurized, said valve rod is urged toward the remote end of said other chamber.

6. A valve construction, comprising: an elongated housing, said housing including means defining chamber means, said chamber means being closed at one of its ends; a passageway connected to the other end of said chamber means and extending longitudinally in said housing, said passageway being of smaller cross-sectional area than said chamber means, said passageway having valve seat means facing said chamber means; said housing having ports therein, one of said ports communicating with said passageway and another of said ports communicating with said chamber means; flexible diaphragm means within and extending transversely across said chamber means and mounted on said housing for flexing movement toward and away from said valve seat means; means on said diaphragm means defining valve member means sealingly engageable with said valve seat means; said diaphragm means having openings therethrough whereby fluid pressure within said chamber means will act on both sides of said diaphragm means; and an axially movable actuating means extending through the remote end of said chamber means and permanently engaging said diaphragm means and being disposed coaxial with said valve member means, said valve member means and said actuating means being imperforate so that fluid can flow into said passageway only when said valve member means is spaced from said valve seat means.

7. A valve construction according to claim 6 wherein said chamber means consists of one chamber, said diaphragm means consists of one diaphragm and said valve seat means consists of one valve seat; said actuating means being a rod of lesser cross-sectional area than said valve element, said valve element having a greater cross-sectional area than said passageway; said diaphragm, said valve element and said rod defining a pair of oppositely facing pressure surface areas, the pressure surface area facing said valve seat being greater than the pressure surface area facing away from said valve seat when said valve element is not contacting said valve seat and being lesser than the pressure surface area facing away from said valve seat when said valve element sealingly contacts the valve seat.

References Cited in the file of this patent

UNITED STATES PATENTS

| Number | Name | Date |
|---|---|---|
| 270,080 | Kelly | Jan. 2, 1883 |
| 1,921,092 | Newton | Aug. 8, 1933 |
| 2,433,420 | Booth | Dec. 30, 1947 |
| 2,537,308 | Hansen | Jan. 9, 1951 |
| 2,553,940 | Quartullo | May 22, 1951 |
| 2,610,819 | Sutton | Sept. 16, 1952 |
| 2,674,266 | Gardner | Apr. 6, 1954 |
| 2,747,801 | Frey | May 29, 1956 |
| 2,768,791 | Frey | Oct. 30, 1956 |